US012592638B2

(12) United States Patent
Ballarin et al.

(10) Patent No.: US 12,592,638 B2
(45) Date of Patent: Mar. 31, 2026

(54) POWER CONVERTER EFFICIENCY BOOST AT LOW LOADS, KEEPING MAXIMUM CONSTANT SWITCHING FREQUENCY OPERATION RANGE

(71) Applicant: Infineon Technologies AG, Neubiberg (DE)

(72) Inventors: Fabio Ballarin, Padua (IT); Andrea Cicognani, Padua (IT)

(73) Assignee: Infineon Technologies AG, Neubiberg (DE)

( * ) Notice: Subject to any disclaimer, the term of this patent is extended or adjusted under 35 U.S.C. 154(b) by 218 days.

(21) Appl. No.: 18/453,904

(22) Filed: Aug. 22, 2023

(65) Prior Publication Data

US 2025/0070663 A1 Feb. 27, 2025

(51) Int. Cl.
*H02M 3/142* (2006.01)
*H02M 1/00* (2006.01)
*H02M 1/32* (2007.01)

(52) U.S. Cl.
CPC ......... *H02M 3/142* (2013.01); *H02M 1/0032* (2021.05); *H02M 1/0054* (2021.05); *H02M 1/32* (2013.01)

(58) Field of Classification Search
CPC ............ H02M 3/02; H02M 3/04; H02M 3/10; H02M 3/135; H02M 3/137; H02M 3/139; H02M 3/142; H02M 3/145; H02M 3/155; H02M 3/1552; H02M 3/156; H02M 3/1563; H02M 3/1566; H02M 3/157; H02M 3/158; H02M 3/1582; H02M 3/1588; H02M 3/22; H02M 3/24; H02M 3/315; H02M 3/3155; H02M 3/325; H02M 3/335; H02M 3/33507; H02M 3/33515; H02M 3/33523; H02M 3/3353; H02M 3/33538; H02M 3/33546;
(Continued)

(56) References Cited

U.S. PATENT DOCUMENTS 9,882,485 B2 * 1/2018 Trichy ................... H02M 1/08
10,784,780 B1 * 9/2020 Scandola ............. H02M 3/157

OTHER PUBLICATIONS

"Battery Management System", Eatron Technologies, Retrieved from: https://eatron.com/portfolio/bmstar-battery-management-system/, Accessed on: Mar. 31, 2023, 8 pp.
(Continued)

*Primary Examiner* — Thienvu V Tran
*Assistant Examiner* — Carlos O Rivera-Perez
(74) *Attorney, Agent, or Firm* — Shumaker & Sieffert, P.A.

(57) ABSTRACT

A switching mode power supply that supplies power to a load. The circuitry of the power supply of this disclosure may be configured to operate with a constant switching frequency over a range of input voltages and a range of load power demand. The circuitry of this disclosure may modulate a minimum on-time (Ton-min) for a duty cycle for an operating frequency of the circuit based on the magnitude of the input voltage. The circuitry may also operate in continuous conduction mode (CCM) or in discontinuous conduction mode (DCM) based on an operating region. The operating region is based on a combination of the demand from the load (Iout) and the input voltage (Vin). The circuitry of this disclosure may enter an operating region based on a first combination but exit the operating region under a second and different combination of Iout and Vin.

13 Claims, 9 Drawing Sheets

100

(58) Field of Classification Search

CPC ........... H02M 3/33553; H02M 1/0003; H02M 1/0016; H02M 1/0022; H02M 1/0025; H02M 1/0032; H02M 1/0035; H02M 1/0048; H02M 1/0054; H02M 1/32; H02M 1/44

USPC ........ 323/222–226, 259, 265, 266, 271–276, 323/282–288, 299–303, 351; 363/15–21.18, 50, 74, 89

See application file for complete search history.

(56) References Cited

OTHER PUBLICATIONS

"Bosch teams up with Microsoft to develop software-defined vehicle platform for seamless integration between cars and cloud", Bosch, Feb. 18, 2021, 3 pp.

"Commercial Fleet Vehicle Electrification", REE, Retrieved from: https://ree.auto/, Accessed on: Mar. 31, 2023, 5 pp.

"Hybrid Car: Definition, Benefits & Types", Infineon, Retrieved from: https://www.infineon.com/cms/en/discoveries/hybrid-vehicles/, Accessed on: Mar. 31, 2023, 12 pp.

"Infineon Technologies' Post", Infineon, Retrieved from: https://www.linkedin.com/posts/infineon-technologies_batteries-power-ai-activity-6995697858658091009-0UjT/?utm_source=share&utm_medium=member_ios, Accessed on: Mar. 31, 2023, 16 pp.

"LMR436x0-Q1, 36-V, 1-A/2-A Buck Converter with <2.5 μA IQ at 150°C. TJMAX in 4-mm2 HotRod™ QFN", Texas Instruments, Oct. 2020, 57 pp.

"REE—the power behind EVs", Youtube, Retrieved from: https://www.youtube.com/watch?v=VxJD0JrPj_4, Jan. 17, 2022, 1 pp.

"REE Automotive Electric Platform Explained", Youtube, Retrieved by: https://www.youtube.com/watch, Dec. 26, 2021, 2 pp.

"REE Automotive", Youtube, Retrieved from:https://www.youtube.com/channel/UC9sDIkFJSj0A7_AvCuHI3gw/videos?view=0&sort=dd, Accessed on: Mar. 31, 2023, 3 pp.

"REE's x-by-wire technology", Youtube, Retrieved from: https://www.youtube.com/watch, Jan. 17, 2022, 1 pp.

"What is the difference between micro, mild, full and plug-in hybrid electric vehicles", x-engineer, Retrieved from: https://x-engineer.org/micro-mild-full-hybrid-electric-vehicle/, Accessed on: Mar. 31, 2023, 8 pp.

Ardeshiri et al., "Machine Learning Approaches in Battery Management Systems: State of the Art: Remaining useful life and fault detection", 2020 2nd IEEE International Conference on Industrial Electronics for Sustainable Energy Systems (IESES), Sep. 1, 2020, pp. 61-66.

Baru, "Deploying Predictive Maintenance Algorithms to the Cloud and Edge", Accessed on: Mar. 31, 2023, 6 pp.

Landman et al., "Applying Universal Chip Telemetry to Detect Latent Defects and Aging in Advanced Electronics", 2022 IEEE International Reliability Physics Symposium (IRPS), Mar. 27, 2022, 4 pp.

Mobility Insider, "What Is a Software-Defined Vehicle?", APTIV, Mar. 19, 2020, 4 pp.

* cited by examiner $$Tonmin = \frac{C \, Vref}{i}$$

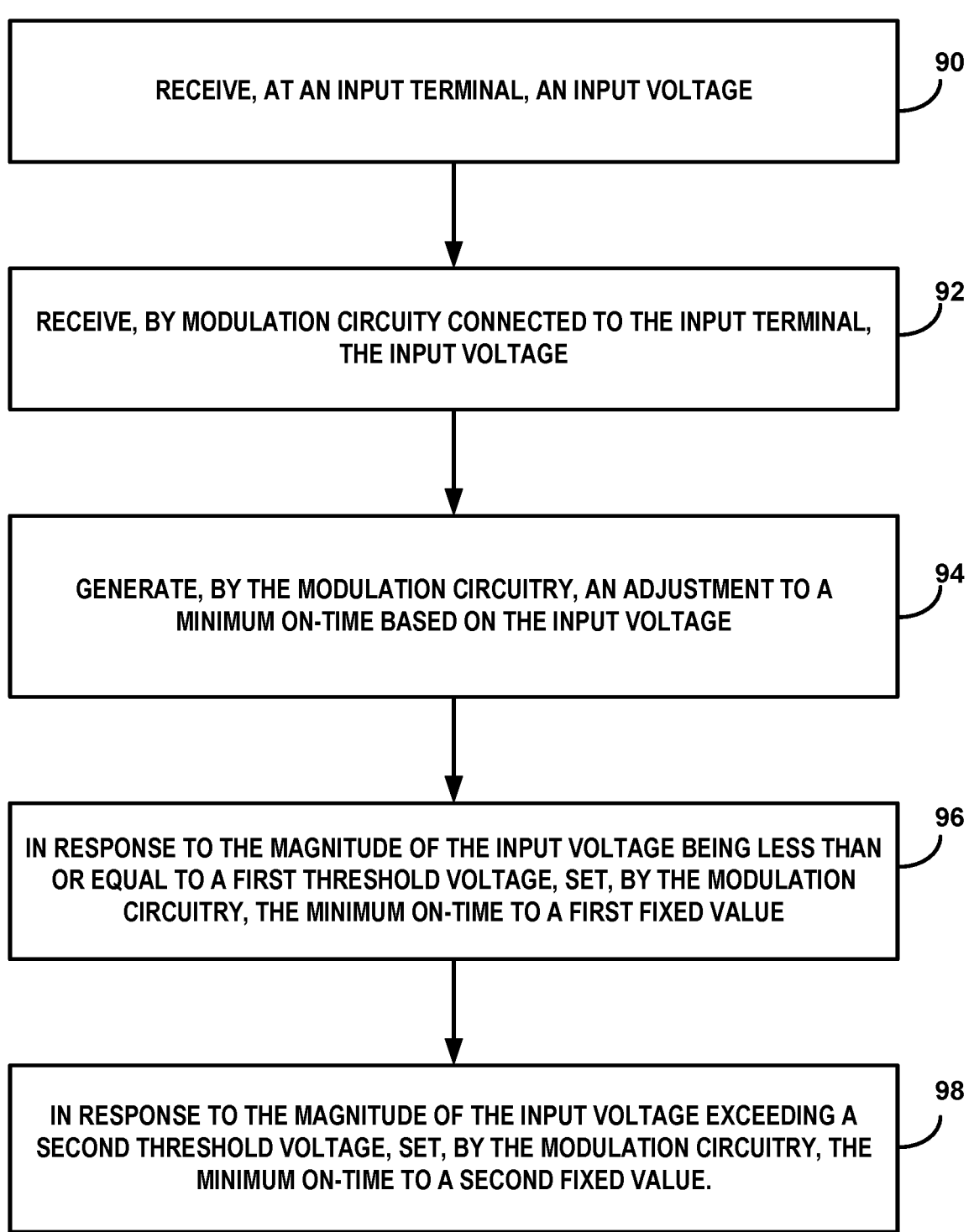

RECEIVE, AT AN INPUT TERMINAL, AN INPUT VOLTAGE — 90

RECEIVE, BY MODULATION CIRCUITY CONNECTED TO THE INPUT TERMINAL, THE INPUT VOLTAGE — 92

GENERATE, BY THE MODULATION CIRCUITRY, AN ADJUSTMENT TO A MINIMUM ON-TIME BASED ON THE INPUT VOLTAGE — 94

IN RESPONSE TO THE MAGNITUDE OF THE INPUT VOLTAGE BEING LESS THAN OR EQUAL TO A FIRST THRESHOLD VOLTAGE, SET, BY THE MODULATION CIRCUITRY, THE MINIMUM ON-TIME TO A FIRST FIXED VALUE — 96

IN RESPONSE TO THE MAGNITUDE OF THE INPUT VOLTAGE EXCEEDING A SECOND THRESHOLD VOLTAGE, SET, BY THE MODULATION CIRCUITRY, THE MINIMUM ON-TIME TO A SECOND FIXED VALUE. — 98

FIG. 9

POWER CONVERTER EFFICIENCY BOOST AT LOW LOADS, KEEPING MAXIMUM CONSTANT SWITCHING FREQUENCY OPERATION RANGE

TECHNICAL FIELD

The disclosure relates to techniques to operate a power converter circuit, specifically to operate a circuit at low load.

BACKGROUND

A power converter circuit may receive electrical power from a source, convert the power in some way, and supply the converted power to a load. In some examples the power converter may receive an alternating current (AC) power and supply direct current (DC) power to a load. In other examples, the power converter may supply AC power, e.g., to a motor converted from DC power, such as a battery. Other types of power converters may also include converting DC power from one voltage level to another. DC power converters that receive power from a battery may be configured to output a predetermined output voltage, while the input voltage may change depending on the charge level of the battery.

SUMMARY

In general, the disclosure describes a switching mode power supply that supplies power to a DC load and receives DC input power. The circuitry of the power supply of this disclosure may be configured to operate with a constant switching frequency over a range of input voltages and a range of load power demand. The circuitry of this disclosure may modulate a minimum on-time (Ton-min) for a duty cycle for an operating frequency of the circuit based on the magnitude of the input voltage. The circuitry may also operate in different modes, e.g., continuous conduction mode (CCM) or in discontinuous conduction mode (DCM) based on an operating region. The operating region is based on a combination of the demand from the load, e.g., output current (Iout) and the input voltage (Vin). The circuitry of this disclosure may enter an operating region based on a first combination but exit the operating region under a second and different combination of Iout and Vin. The controlling circuitry for this disclosure may be implemented in a number of ways, some of which include an analog circuitry, digital circuitry including, in some examples, an analog to digital converter (ADC), logic circuitry or some combination of circuit types.

In one example, this disclosure describes a circuit comprising an input terminal configured to receive an input voltage; and modulation circuitry connected to the input terminal, wherein the modulation circuitry is configured to define a minimum on-time based on the input voltage, wherein minimum on-time is proportional to an inverse magnitude of the input voltage, and wherein the minimum on-time is a minimum duration for an on-time of a duty cycle for an operating frequency of the circuit.

In another example, this disclosure describes a system comprising an output terminal configured to deliver power to a load; an input terminal configured to receive an input voltage; and modulation circuitry connected to the input and output terminals and configured to: define a minimum on-time based on the input voltage, wherein the adjustment is proportional to an inverse magnitude of the input voltage, and wherein the minimum on-time is a minimum duration for an on-time of a duty cycle for an operating frequency of the circuit.

In another example, this disclosure describes a method comprising receiving, at an input terminal, an input voltage; and receiving, by modulation circuitry connected to the input terminal, the input voltage; generating, by the modulation circuitry, an adjustment to a minimum on-time based on the input voltage, wherein the adjustment is proportional to an inverse magnitude of the input voltage, and wherein the minimum on-time is a minimum duration for an on-time of a duty cycle for an operating frequency of the circuit.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 9 is a flow chart illustrating an example operation of the circuitry of this disclosure.

DETAILED DESCRIPTION

This disclosure describes a power supply, implemented in circuitry, configured to modulate a minimum on-time (Ton-min) for a duty cycle of the circuit based on the magnitude of the input voltage. The power supply is also configured to operate in different modes, e.g., continuous conduction mode (CCM) or in discontinuous conduction mode (DCM) and to adjust the combination of conditions that trigger the power supply to exit from a given operating mode to be different than the combination of conditions that triggered the power supply to enter that operating mode. In this manner, the power supply of this disclosure may operate with a constant frequency over a broad range of conditions (input voltage and load demand), while also operating with higher efficiency under light loads when compared to other types of power supply circuits.

Figure 1:
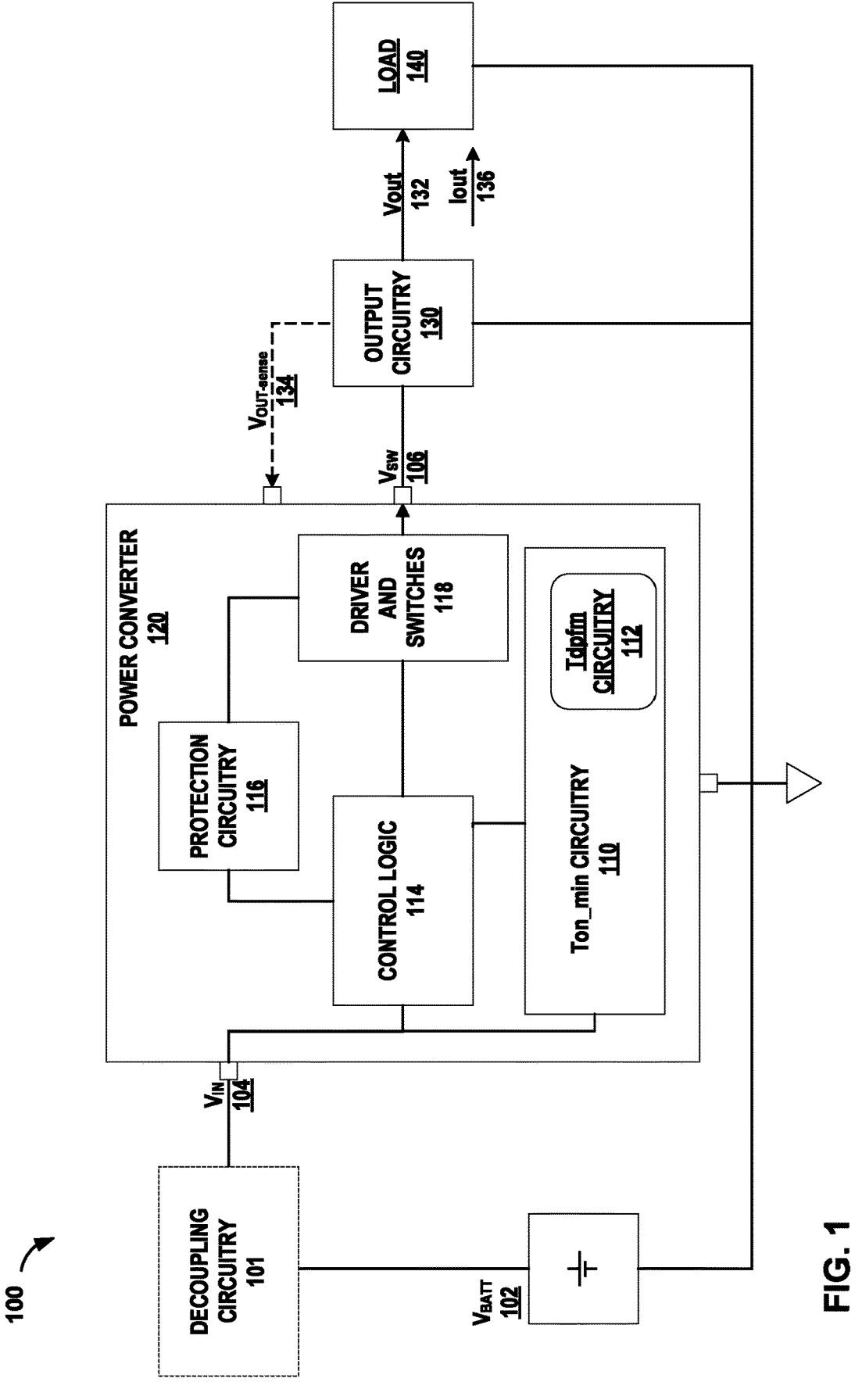
FIG. 1 is a block diagram illustrating an example power converter system of this disclosure.

FIG. 1 is a block diagram illustrating an example power converter system of this disclosure. System 100 in the example of FIG. 1 includes a switching mode power supply that supplies power to DC load 140 and receives DC input power from a battery. System 100 may include decoupling circuitry 101, which may include filtering circuits, e.g., implement with resistors, capacitors, inductors and semi-conductors (not shown in FIG. 1) that may help prevent noise and other unwanted disturbances from reaching the input terminal Vin 104 and affecting the operation of power converter 120.

System 100 may also include output circuitry, in some examples, that may include inductors, capacitors and other circuitry to regulate and filter power from the switching node Vsw 106 of power converter 120 before supplying the power to DC load 140 via output terminal Vout 132. In some examples, output circuitry 130 may include a voltage sam-pling circuit, e.g., a resistor divider (not shown in FIG. 1) to sense the output voltage at Vout 132 as part of a feedback loop for power converter 120. In the example of FIG. 1, the sensed output voltage of power converter 120 may be externally adjustable and Vout-sense 134 comes from a resistor divider, or similar circuit of output circuitry 130. In other examples, the output sensing circuit may be internal to power converter 120.

The circuitry of power converter 120, in the example of FIG. 1, includes drivers and switches 118, e.g., a half-bridge, full-bridge or similar switching circuit under the control of control logic 114. Protection circuitry 116 may monitor power converter 120 and protect power converter 120 from fault conditions such as over voltage, and over current, excessive temperature or other fault conditions. In other examples, power converter 120 may include an analog control loop, rather than logic circuitry 114.

In some examples, power converter 120 may be config-ured as a buck converter to reduce the input voltage mag-nitude at Vin 104 to a reduced magnitude voltage at Vout 132. In other examples, power converter 120 may be con-figured as a boost converter, buck-boost converter or some other type of switched mode power supply. In the example of a buck converter, output circuitry 130 may include an output inductor circuit, e.g., with an inductance L. Other examples of power supplies may include a boost converter, a buck-boost converter, or other types of converters.

System 100 also includes Ton-min circuitry 110, which may modulate the minimum on-time as the input voltage at Vin 104 changes. As noted above, as a battery is charged and discharged, the voltage output from the battery, Vbatt 102 may change based on the battery state of charge, also referred to as the depth of discharge (DOD). Vin 104 may also vary based on operation of the larger system (not shown in FIG. 1) of which system 100 is a part as well as based on environmental disturbances. For example, Vin 104 may change because of any of several operating transients (e.g. "cold start", pin short interruptions . . . ), which are also described in LV124 Test Standard for Automotive, which include quality and reliability tests, such as how to subject systems to electrical disturbances that simulate those in an automobile's electrical system during driving.

Ton-min circuitry 110 may also connect to $T_{DPFM}$ cir-cuitry 112. When operating in in deep-PFM (DPFM), $T_{DPFM}$ circuitry 112 may adjust Ton-min and to adjust Tdpfm to shift the DPFM exit threshold boundary. In other words $T_{DPFM}$ circuitry 112 may be configured to increase the threshold period duration, such that the circuit enters DPFM with a first set of operating conditions of the input voltage and an output current, and the circuit exits DPFM with a second set of operating conditions. In some examples, the circuitry of this disclosure may operate in DPFM for light loads, e.g., when the load demands only a small amount of current, such as in a "sleep" mode or other similar low current mode. The circuitry of this disclosure may enter DPFM, e.g., when switching period becomes greater than the internally defined time reference, Tdpfm at lower loads.

Vin 104 comprises an input terminal for power converter 120, and Vin 104 may be configured to receive an input voltage from Vbatt 102, which may be conditioned and filtered by decoupling circuitry 101. Ton_min circuitry 110 may comprise modulation circuitry connected to input ter-minal Vin 104. Ton-min circuitry 110 may be configured to define a minimum on-time based on the input voltage. Specifically, for the switching mode power supply of this disclosure, Ton_min circuitry 110 modulates the minimum on-time to be proportional to an inverse magnitude of the input voltage. For some low values of Vin 104, e.g., a low Vbatt 102, and for some high values of Vin 104, Ton_min circuitry 110 may be configured to clip a minimum on-time, e.g., set the minimum on-time to a constant that does not depend on the magnitude of Vin 104.

In the context of a switching power supply, and specifi-cally a buck power converter, the phrase minimum on-time may refer to a minimum duration for an on-time of a duty cycle for an operating frequency of the circuit. For a buck converter, the maximum switching frequency depends on the "minimum on-time" of the converter. The minimum on-time may depend on speed limitations of the internal circuitry as well as limitations on configuring control loop stability. For the digital example shown in FIG. 1, the timing and logic circuitry inside controller 114 that switches from one state to the other, can only switch as fast as the selection of components may allow. Wider-bandwidth circuitry may operate with narrow pulse widths.

Thus, the "minimum on-time" has a specific meaning based on the implementation of a power converter circuit. The exact value of "minimum on-time" may be technology dependent and voltage class dependent, e.g., a power con-verter for voltages greater than 50V may operate with different circuitry and different timing than a power con-verter for voltages such as 12V or less. For example, for drivers and switches 118, a particular selection of circuitry may define how fast the switches may cycle, e.g., to switch ON and switch OFF. The "minimum on-time," Ton-min, therefore, may also be defined based on an amount of charge that can be transferred during a switching cycle. In this manner, Ton-min may be a selected design criterion based on the application and implementation for the power con-verter circuit. For some circuits, like system 100, that include both digital and analog circuitry, if the analog circuitry operation cycle is slower than the speed of the digital circuitry, that the analog circuitry may be the limiting factor in determining Ton-min. Similarly, if the digital circuitry speed, e.g., based on the clock, loop stability or other factors, is slower than the analog circuitry, then the digital circuitry limitations may determine Ton-min.

In some examples, the minimum on-time may be related to the peak output current limit. A current controlled power converter with electrical current sense circuit may have taken some time to sense the output current, Iout 136. This sense time may be on the order of approximately 60 ns. For such a circuit, Ton-min may be set to 60 ns or longer to allow the current sense circuit to determine Iout 136. In other examples, a voltage controlled power converter may have Ton-min as low as 10 ns because a voltage sense circuit may operate faster than a current sense circuit.

The circuitry of this disclosure may modulate the minimum on-time, Ton-min, based on the input voltage, Vin 104, but maintains the same duty cycle, in some operating modes. Power converter 120 may operate in at least one of: pulse-width modulation (PWM) continuous conduction mode (CCM), PWM discontinuous conduction mode (DCM), pulse frequency modulation (PFM) CCM or PFM-DCM, as well as DPFM.

Continuous or discontinuous conduction refers to whether or not the current in the energy storage element (e.g., an inductor in the example of a buck converter) goes to zero each switching cycle. In the example of system 100, the energy storage element, such as an inductor, (not shown in FIG. 1) may be located in output circuitry 130. In CCM the current does not reach zero so at the end of every switching cycle there is some energy left. Power converter 120 may add energy to the energy storage element in the next cycle such that the current does not go to zero. In DCM, all the energy each cycle is used up and the inductor sits with no current and no stored energy for part of each switching cycle.

Energy stored by system 100, e.g., in reactive circuit components such as an inductance, L, of output circuitry 130, may relate to output power supplied to the load. Operating in DCM or CCM depends on input voltage, Vin 104, and the output load demand. Power converter 120 may operate in CCM when Vin 104 is low and the load demand is high, e.g., a higher output current Iout 136, and may switch to DCM for a high Vin 104 and/or reduced load demand, e.g., a lower Iout 136. In the examples of this disclosure, control logic 114 may operate power converter 120 using pulse width modulation (PWM) for higher current loads, and pulse frequency modulation (PFM) for high Vin 104 and/or lower current loads, Iout 136.

Ton_min circuitry 110 may also clip the minimum on-time at lower input voltages and at higher input voltages, rather than strictly adhering to adjusting Ton-min based on 1/Vin. In other words, in response to the magnitude of the input voltage being less than or equal to a first threshold voltage, Ton-min circuitry 110 may set the minimum on-time to a first fixed value. Similarly, in response to the magnitude of the input voltage exceeding a second threshold voltage, Ton-min circuitry 110 may set the minimum on-time to a second fixed value. As noted above, Ton-min circuitry 110 may be implemented as analog circuitry, digital circuitry or some combination of circuitry. In other examples, Ton-min circuitry 110 may operate within a range of Ton-min, e.g., a range with a high threshold and a low threshold for Ton-min, rather than clipping Ton-min based on the Vin 104.

System 100 of this disclosure may offer advantages over other types of power converter systems. By modulating Ton-min as Vin 104 changes, the circuitry of this disclosure may maintain a constant operating frequency over a broad range of conditions (e.g., a range of changes in Vin 104 and changes in Iout 136). A constant operating frequency, at mid to high load demand (e.g., more than 100 mA in some examples) may mean the power converter of this disclosure operates with electromagnetic compatibility (EMC) performance that reduces or eliminates electromagnetic interference (EMI) with other portions of the system (not shown in FIG. 1). For example, in an electric vehicle or similar system that include components sensitive to EMI, e.g., processors, sensing circuits and similar components, reduced EMI may mean more reliable system operation, reduced shielding requirements, and reduced cost. Note that the Iout 136 threshold that indicates "mid to high load demand" may be implemented flexibly to a range of output current magnitudes by the power converter circuitry of this disclosure and may be less than 100 mA or greater than 100 mA is some examples.

In this disclosure, "constant frequency" operation, or "fixed frequency" means an operating frequency that varies within a relatively small range of a desired frequency. Some small variation in the operating frequency, e.g., within a few Hertz of the desired frequency may still be considered a "constant frequency." The frequency range variation around the operating frequency may be in the order of +/−5% or +/−10%, and may be defined by the tolerance of the electrical components used in the circuitry.

In addition, modulating Ton-min, and clipping Ton-min under predetermined conditions, e.g., for Vin 104, may result in higher circuit operating efficiency, especially at lower load demand, such as in the range of 10 mA or less. In some examples, the efficiency of the power converter of this disclosure may be more than 40% improvement over similar types of power converters. As with the mid to high load demand threshold above, the "lower load demand" threshold may be selectable as a design criteria, may be flexibly implemented by the circuitry of this disclosure and may be less than 10 mA or greater than 10 mA in other examples.

In some applications, boosting efficiency at low loads means that less emissions, e.g., $CO_2$ emissions, are generated when product operates in low power modes. The overall impact on $CO_2$ saving may high in the lifetime of the product, since some applications for the power converter of this disclosure may operate low power modes for a large percentage of time, when compared to higher powered modes. For example, some systems for an electric or hybrid vehicle may operate in sleep mode or other low powered mode for a longer net duration than while driving, over the life of the vehicle.

Figures 2A, 2B:
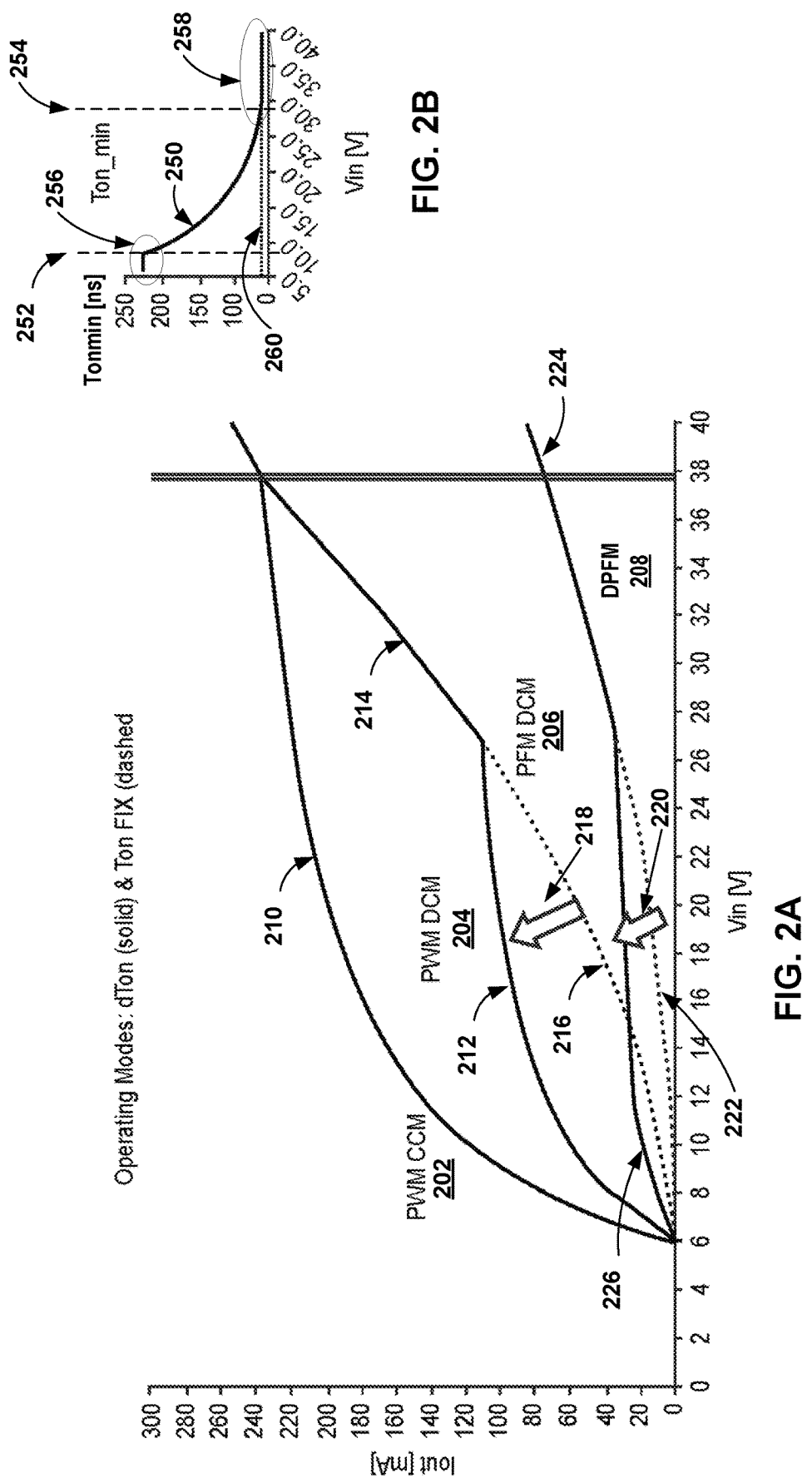
FIGS. 2A and 2B are charts showing an example operation of the circuitry of this disclosure implementing Ton_min modulation.

FIGS. 2A and 2B are charts showing an example performance of the circuitry of this disclosure implementing both Ton_min modulation. As described above in relation to FIG. 1, the power converter of this disclosure may also operate in different modes based on an operating region. The operating region is based on a combination of the demand from the load, e.g., output current (Iout) and the input voltage (Vin). The example values listed along the X and Y axes of FIGS. 2A and 2B are only example values for the purpose of describing the power converter of this disclosure. In other examples, the values for output current, input voltage and the locations of the operating region boundaries may differ from the example in FIGS. 2A and 2B.

In the example of FIG. 2A, the circuitry of a power converter may operate in the PWM CCM 202 region for lower input voltages and for combinations of higher input voltage and higher output current, e.g., higher load demand. The CCM to DCM boundary is shown by 210. In this manner, the power converter may continue with a constant frequency PWM for combinations of lower Iout, across a range of input voltages in the PWM DCM 204 region.

In contrast to the circuitry of the disclosure, for an example of a power converter circuit that operates with a fixed Ton-min, e.g., Ton-min 260 shown in FIG. 2B, the boundary between operating in PWM DCM 204 and changing to pulse frequency modulation in the PFM DCM 206 region is indicated by 216. By implementing step 1 of this disclosure, e.g., modulating Ton-min based on 1/Vin, the power converter of this circuitry may shift the boundary (218) from 216 to 212. In this manner the power converter of this disclosure may operate with higher efficiency at reduced load demand (less than approximately 100 mA in the example of FIG. 2A) when compared to operation with a fixed Ton-min. By clipping the Ton-min modulation 258, e.g., for Vin above a threshold 254, the constant frequency operation for higher load current, e.g., more than about 100 mA for the example of FIG. 2A, is unchanged. As described above in relation to FIG. 1, operating at a constant frequency may result in better EMC performance when compared to a changing operating frequency.

Similarly, in the example of a power converter circuit that operates with a fixed Ton-min 260, the boundary between operating in PFM DCM 206 and changing to deep pulse frequency modulation in the DPFM 208 region, e.g., for, light load demand, such as a low Iout less than about 40 mA, is indicated by 222. By implementing step 1 of this disclosure the power converter of this circuitry may shift the boundary (220) from 222 to 226. This shift may improve efficiency for low Iout, e.g., dormant or sleep mode, when compared to operation with a fixed Ton-min. In the example of FIG. 2A, for combinations of higher Vin and higher Iout, the boundary 224 between DPFM 208 operation and PFM DCM 206 may be given by:

$$I_{out} = \frac{V_{in}(V_{in} - V_{out})T_{on}^2}{2L \times V_{out} \times T_{DPFM}} \quad [1]$$

where Tdpfm is a threshold duration for the operating PFM period, and L is the inductance for the energy storage device, described above in relation to FIG. 1.

In some examples, step 1 of this disclosure also includes clipping Ton-min for low Vin, e.g., Vin 104 of FIG. 1. In other words, in response to the magnitude of the input voltage being less than or equal to a threshold voltage 252, the Ton-min modulation circuitry of this disclosure may set the minimum on-time to a fixed value 256. In the example of FIG. 2B, for values of Vin less than approximately eight volts, the Ton-min modulation circuitry may fix Ton-min to about 225 milliseconds (ns). As noted above, these values are just examples to help explain the operation of the circuitry of this disclosure. In other examples, the Ton-min modulation circuitry may use a different Vin lower threshold value 252 and may set Ton-min to a different duration 256 for input voltages less than the threshold value 252.

The Ton-min modulation circuitry of this disclosure, e.g., Ton-min circuitry 110 of FIG. 1, may also perform a second step in response the power converter operating in DPFM 208. While operating in PFM-DCM 206, and the load demand decreases such that the power converter operation crosses boundary 226 and enters DPFM 208, and in response to the associated operating period exceeding a threshold period duration, Tdpfm, the Ton-min modulation circuitry may increase the minimum on-time, Ton-min. The circuitry may also increase the threshold, Tdpfm. As a result, the circuit may enter DPFM 208 operation based on boundary 226, but the increase in Ton-min, and increase in Tdpfm causes a shift in boundary 226 such that the circuit operation exits DPFM 208 into PFM-DCM 206 based on a different combination of conditions for Iout and Vin than the combination of conditions for which the circuit operation entered DPFM 208. This increase in the minimum on-time may further increase the conversion efficiency in such operating regions.

Figure 3:
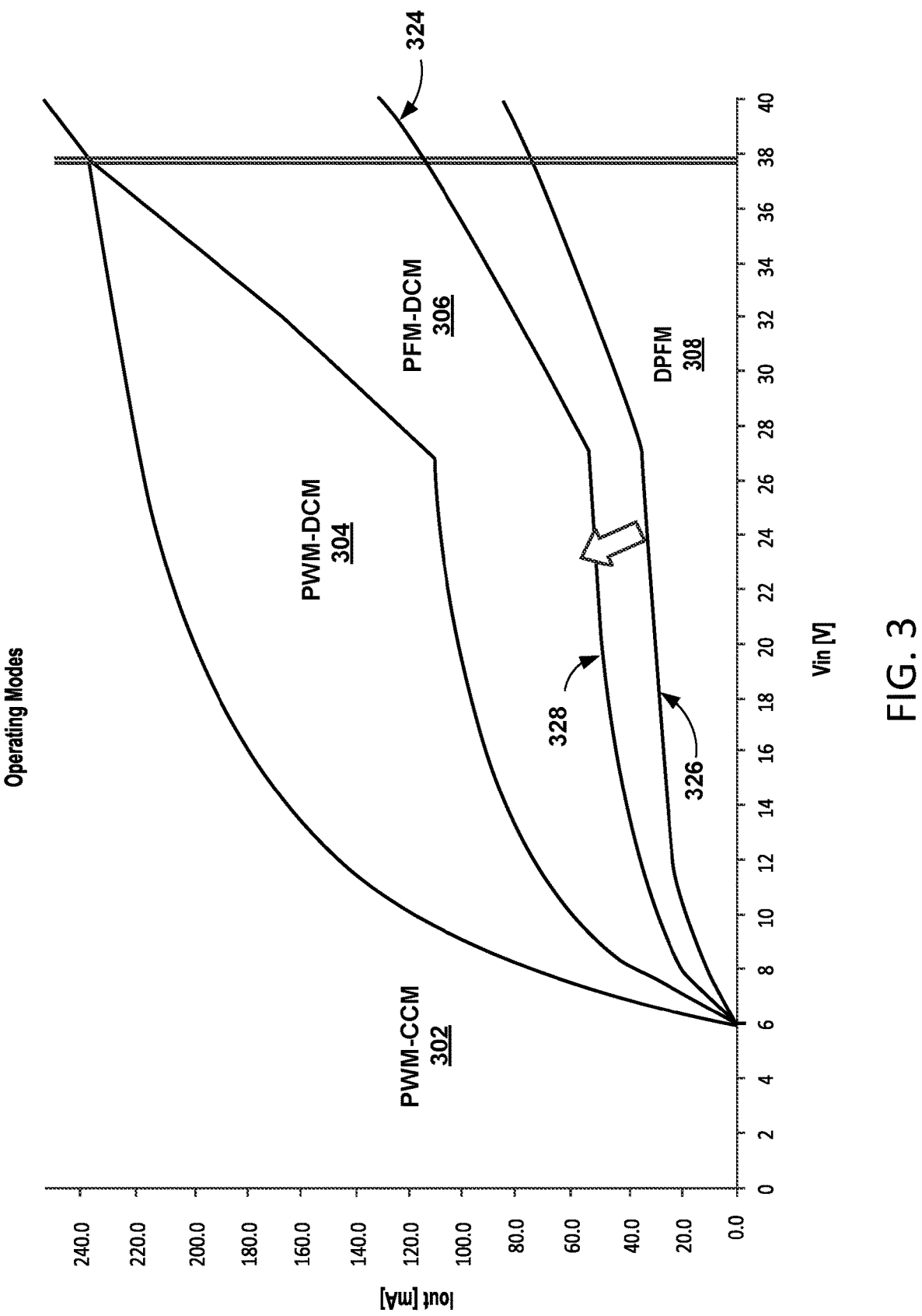
FIG. 3 is chart illustrating an example operation of the circuitry of this disclosure that changes the entrance and exit threshold of DPFM.

FIG. 3 is chart illustrating an example operation of the circuitry of this disclosure that changes the entrance and exit threshold of DPFM. As described above in relation to FIGS. 2A and 2B, the Ton-min modulation circuitry of this disclosure may be configured to shift the boundary between DPFM 308 and PFM-DCM 306.

In some examples, for a power converter circuit, such as a buck converter described by this disclosure, to maximize the operating conditions under which the power converter operates in PWM-CCM 302, the Ton-min should be relatively small. Also, a power converter operating at a constant frequency may deliver better EMC performance than operating in PFM. Said another way, to reduce the operating regions for PFM, the duration for Ton-min should be relatively short. However, there is a trade-off to also operate with a desired efficiency when the load, e.g., load 140 of FIG. 1, has a low demand, e.g., in sleep mode. As shown in the example of FIG. 3, as well as in FIG. 2A, the power converter circuit of this disclosure may cross from PWM-CCM 302 to PWM-DCM 304, and to PFM-DCM 306 as load current demand decreases. For low Iout and for Vin greater than six volts, in the example of FIG. 3, the power converter may enter DPFM 308, e.g., when crossing the operating conditions boundary 326. The conditions for entering DPFM 308 may also be described as conditions under which the PFM period is greater than a threshold period, Tdpfm, described above in relation to FIGS. 2A, 2B, and 7.

In contrast to other power converters, the Ton-min modulation circuitry of this disclosure may increase Ton_min and increase Tdpfm when the Ton-min modulation circuitry determines the power converter is operating in DPFM 308. As described in FIG. 3 in, the increase of Ton_min and increase of Tdpfm results in the power converter DPFM entrance threshold 326 to shift so that the exit threshold boundary becomes 328. In other words, the increase of Ton_min after entering DPFM may provide an increased efficiency. As a side effect, the increase in Ton_min may also shift the DPFM exit threshold 326 on the Y-axis (to higher Iout values 328). The increase of Tdpfm may compensate this undesired effect, producing a down shift of DPFM exit threshold to maximize the parameter range of constant frequency operation as shown by boundary portion 324.

Figure 8:
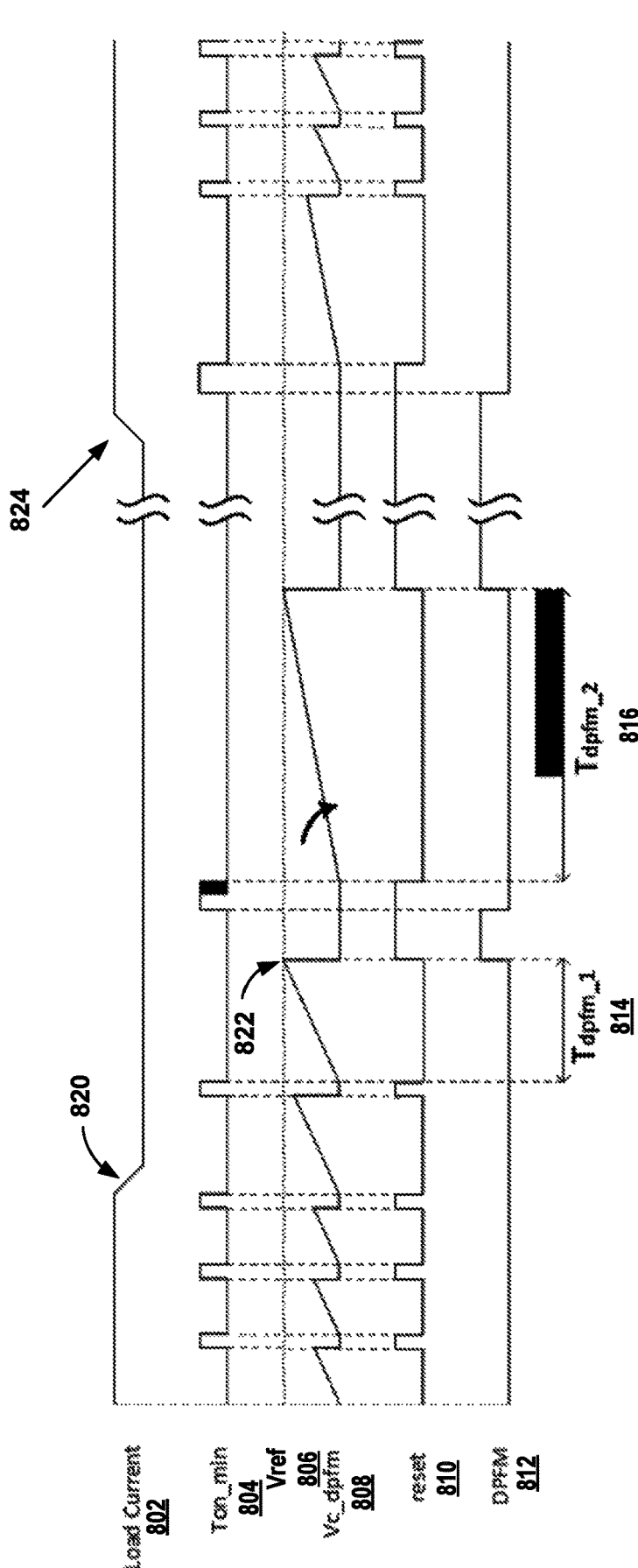
FIG. 8 is timing chart illustrating an example of extending time periods when in DPFM.

Also, the operating mode boundaries, the amount of boundary shift and other features of the power converter of this disclosure may be user selectable to trade-off efficiency with other desired performance characteristics. The details of steps 1 and 2 of this disclosure may configured flexibly, e.g., in the circuit design or in silicon to minimize driving and switching losses and optimize other performance characteristics. For the power converter of this disclosure, Vout ripple is the limit, not the architecture of the circuitry. As described above in relation to FIG. 1, the Ton-min modulation circuitry of this disclosure may be implemented as analog circuitry, digital circuitry or some combination. In the analog circuitry example of FIG. 5B, circuit 500 may be configured to increase Ton-min by any one or more of increase the circuit capacitance of $C_{Ton}$ circuit 522, increase reference voltage Vref 554 or decrease the amount of current 516 injected into $C_{Ton}$ circuit 522. These actions may increase the amount of time it takes to charge $C_{Ton}$ circuit 522 and thereby increase the time for the inverting input of comparator 540 to ramp to Vref 554 and thus the time for comparator 540 to toggle. This operation is also shown in FIG. 8.

Figure 4:
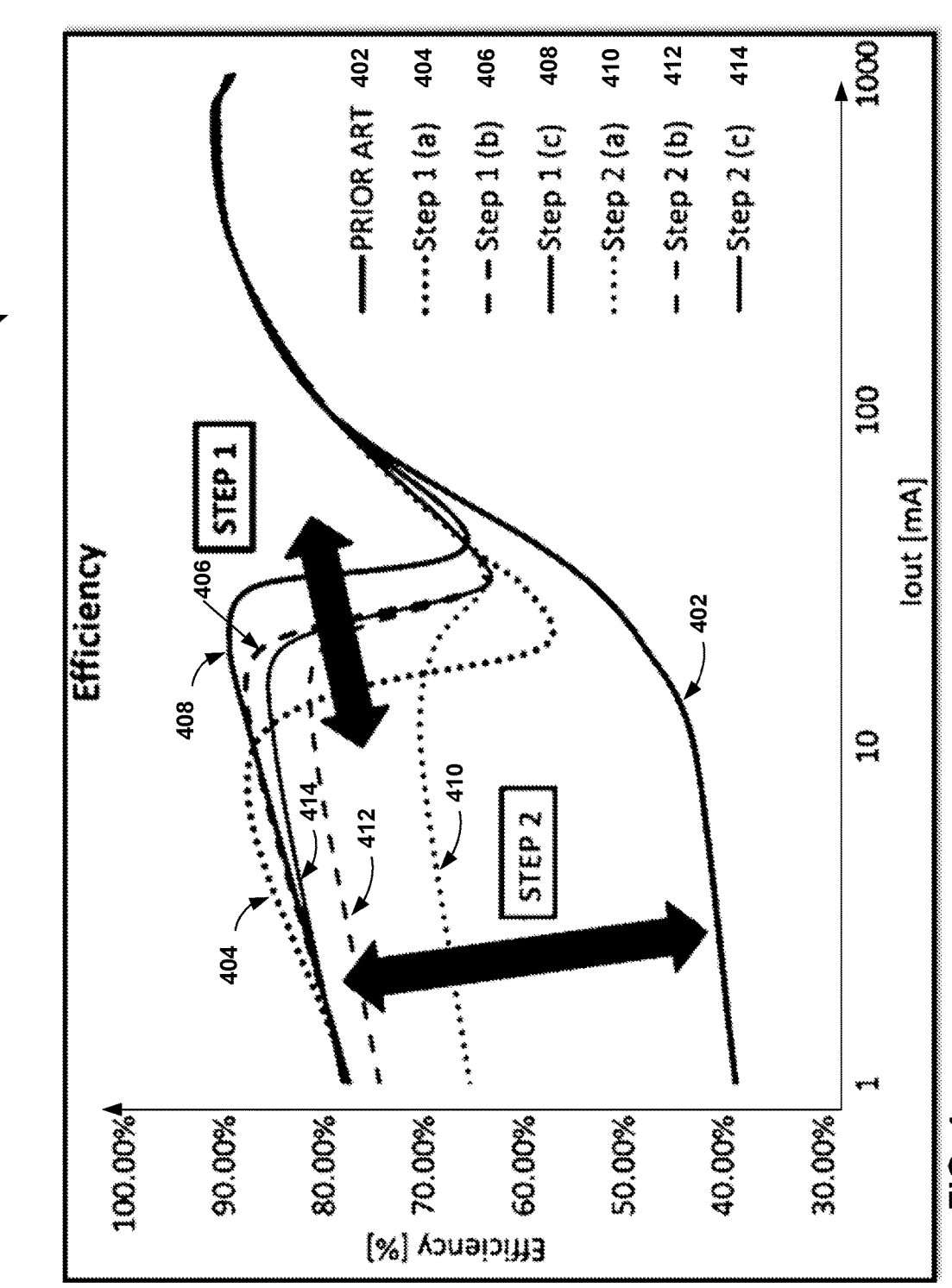
FIG. 4 is a chart illustrating the user selectable tradeoff for low load performance efficiency versus range of constant frequency operation of the circuitry of this disclosure.

FIG. 4 is a chart illustrating user selectable tradeoff for low load performance efficiency versus range of constant frequency operation of the circuitry of this disclosure. As with the other charts of this disclosure, the values along the X and Y axes are an example of values used to describe the circuitry of this disclosure. In other examples, the specific shape of the curves and the axis values may differ.

The example of FIG. 4 shows the performance of different examples for the power converter circuitry of this disclosure. Step 1 (Ton modulation) and Step 2 (Ton increase in DPFM) may be selected flexibly and independently by the user of the power converter circuitry of this disclosure. Making adjustments to the Ton-min modulation may balance the efficiency boost while operating at light loads against the operating range for constant frequency range at mid to high output current to the load. Adjusting the Ton-min increase when entering DPFM may balance efficiency boost at light loads against Vout ripple.

Figures 5A, 5B:
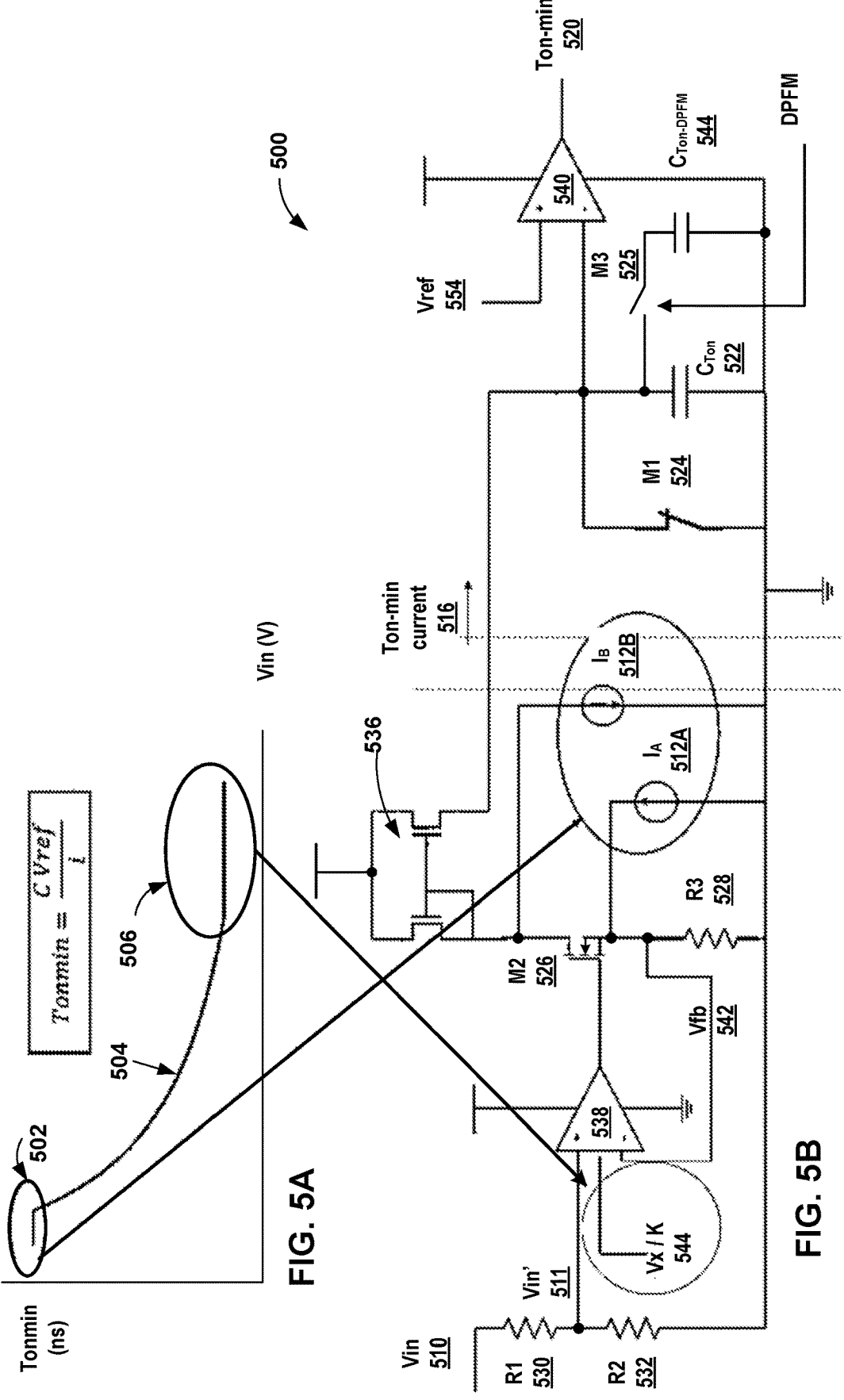
FIG. 5A is a chart illustrating an example of modulating the minimum on-time for the power converter circuit of this disclosure.
FIG. 5B is a circuit diagram of an example analog circuit implementation of the Ton_min modulation circuit of this disclosure.

FIG. 5A is a graph illustrating an example of modulating the minimum on-time for the power converter circuit of this disclosure. The example of FIG. 5A is an example of the graph of FIG. 2B, describing the modulation of Ton-min by the Ton-min modulation circuitry.

FIG. 5B is an example analog circuit implementation of the Ton_min modulation circuit of this disclosure. Circuit 500 in the example of FIG. 5B illustrates the implementation of Step 1, (e.g., Ton-min modulation based on 1/Vin). For Step 2, the implementation of increasing Ton-min includes increasing the capacitance, $C_{Ton}$ 522, as well as updating the value of Tdpfm timer when operating in DPFM. Other steps to increase Ton-min may include decrease current 516 or increase the value of Vref 554, as described above. Circuit 500 is an example of the Ton-modulation circuitry 110 described above in relation to FIG. 1.

In the example of circuit 500, the non-inverting input of operational transconductance amplifier, OTA 538, receives an indication of the input voltage, Vin 510, via the resistor divider that includes resistor R1 530 in series with R2 532 and connected to Vin 510. Vin 510 is an example of Vin 104 described above in relation to FIG. 1.

OTA 538 may be part of a feedback loop in which electric current through transistor M2 526 is based on Vin'/R3, which is also the mirror current for the current mirror 536. A first leg of mirror current 536 connects in series through the drain-source channel of M2 526 and R3 528 to ground. The feedback voltage, Vfb 542 connects to the inverting input of OTA 538 and between M2 526 and R3 528 to connect the voltage across the R3 528 to OTA 538.

Current sources 512A and 512B are configured to generate the same amount of electrical current and the arrangement of current sources 512A and 512B control the clipping 502 at low values of the input voltage, Vin 510. Current source 512A connects between the source of N-channel MOSFET M2 526 and ground while current source 512B connects between the drain of M2 526 and ground. Current source 512A injects current at the source of M2 526 and current source 512B sinks current from the drain of M2 526.

Current mirror 536 is configured to output current 516, which is injected into the $C_{Ton}$ 522. Current 516 may also be referred to as the Ton-min current, $i_{Ton-min}$ 516. When operating in DPFM mode, switch M3 525 may receive a signal DPFM 542, which may add $C_{Ton-DPFM}$ 544 to $C_{Ton}$ 522, thereby increasing the time to for the inverting input of comparator 540 to charge to Vref 554. Switch M1 524 acts as a reset to discharge the capacitance of circuit 500, e.g., of $C_{Ton}$ 522 or the combination of $C_{Ton-DPFM}$ 544 and $C_{Ton}$ 522.

Comparator 540 receives the voltage across the circuit of $C_{Ton}$ 522 at the inverting input. The non-inverting input of comparator 540 connects to a reference voltage Vref 54. The output of comparator 540, Ton-min 520 adjusts the minimum on time.

In the example shown in FIG. 5B, Vx/K 544 is also an input to OTA 538. Selecting values for Vx/K 544 may control the clipping 506 at higher input voltages, Vin 510, as described above in relation to FIGS. 1-3. In this manner, by selecting the components and component values for circuit 500, and tuning the ratio for current mirror 536, a user may select the desired performance of the Ton-modulation circuitry and the power converter circuit.

Figure 6:
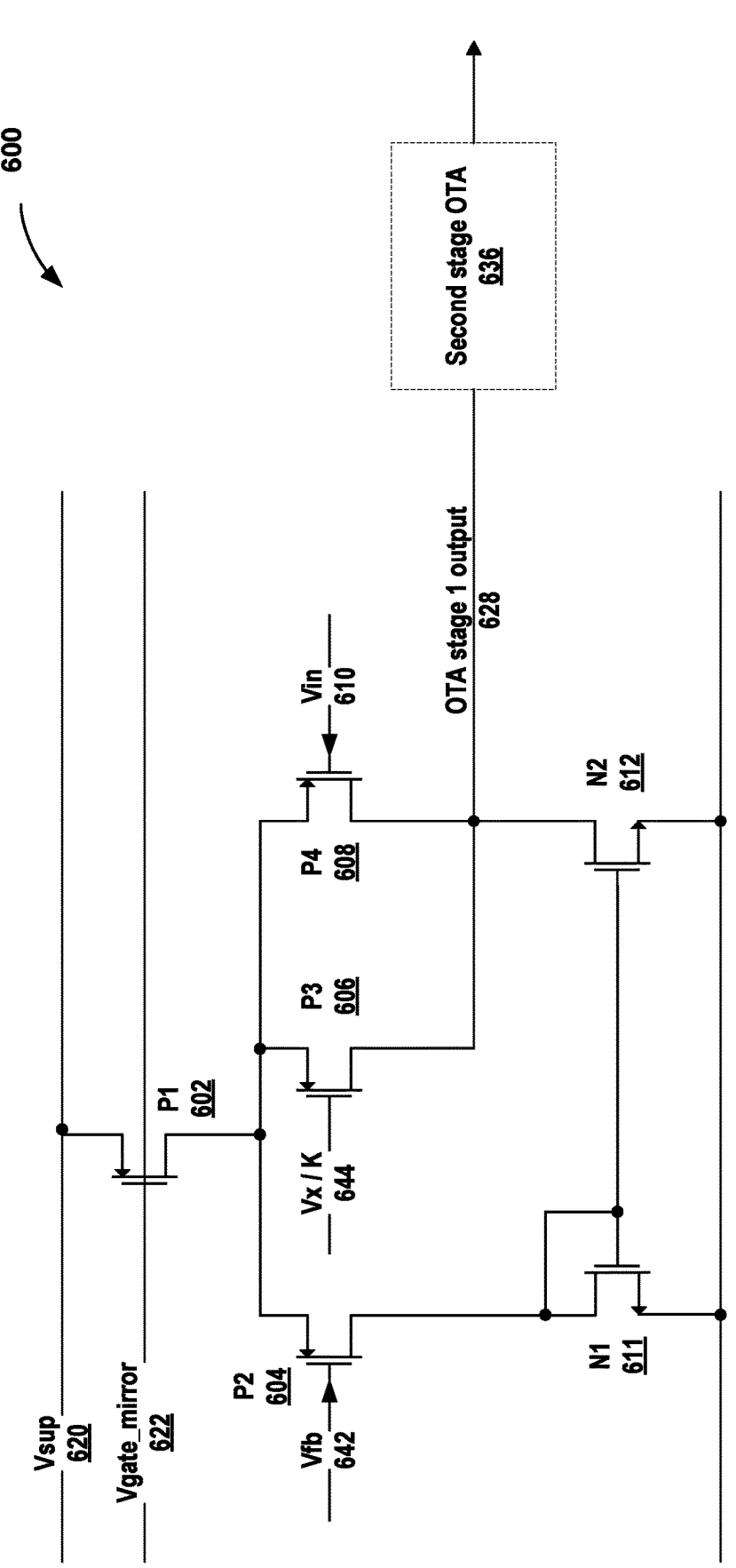
FIG. 6 is a schematic diagram illustrating example implementation of circuitry of this disclosure configured to clip Ton_min at higher input voltages.

FIG. 6 is a schematic diagram illustrating example implementation of circuitry of this disclosure configured to clip Ton-min at higher input voltages. Circuit 600 is an example of OTA 538 described above in relation to FIG. 5B. In the example of FIG. 6, Circuit 600 is shown as a multiple stage OTA. FIG. 6 only describes details for the first stage of the OTA. OTA stage 1 output 628 connects to second stage 636, and any subsequent stages (not shown in FIG. 6). Circuit 600 illustrates just one possible example implementation of a portion of the Ton-min modulation circuitry of this disclosure. In other examples, different circuit arrangements and components may also be used.

In FIG. 6, Vin 610, Vx/K 644, and Vfb 642 are respectively examples of Vin' 511 Vx/K 544, and Vfb 542 described above in relation to FIG. 5B. Vsup 620 supplies power to the OTA of circuit 600 via P-channel MOSFET, P1 602. The gate of P1 602 connects to Vgate_mirror 622.

In the example of FIG. 6, N channel transistors N1 611 and N2 612 are arranged as a current mirror, with the sources of N1 611 and N2 612 connected to a reference voltage, e.g., a circuit ground, the gate of N1 611 connected to the drain of N1 611 and to a drain of P-channel transistor P2 604. The drain of N2 612 connects to OTA stage 1 output 628 and to a drain of P4 608. The gate of P2 604 connects to Vfb 642 and the gate of P4 608 connects to Vin 610.

The source of P1 602 connects to Vsup 620 and the drain of P1 602 connects to the source of P2 604, P3 606 and P4 608. The gate of P3 606 receives Vx/K 644.

Figure 7:
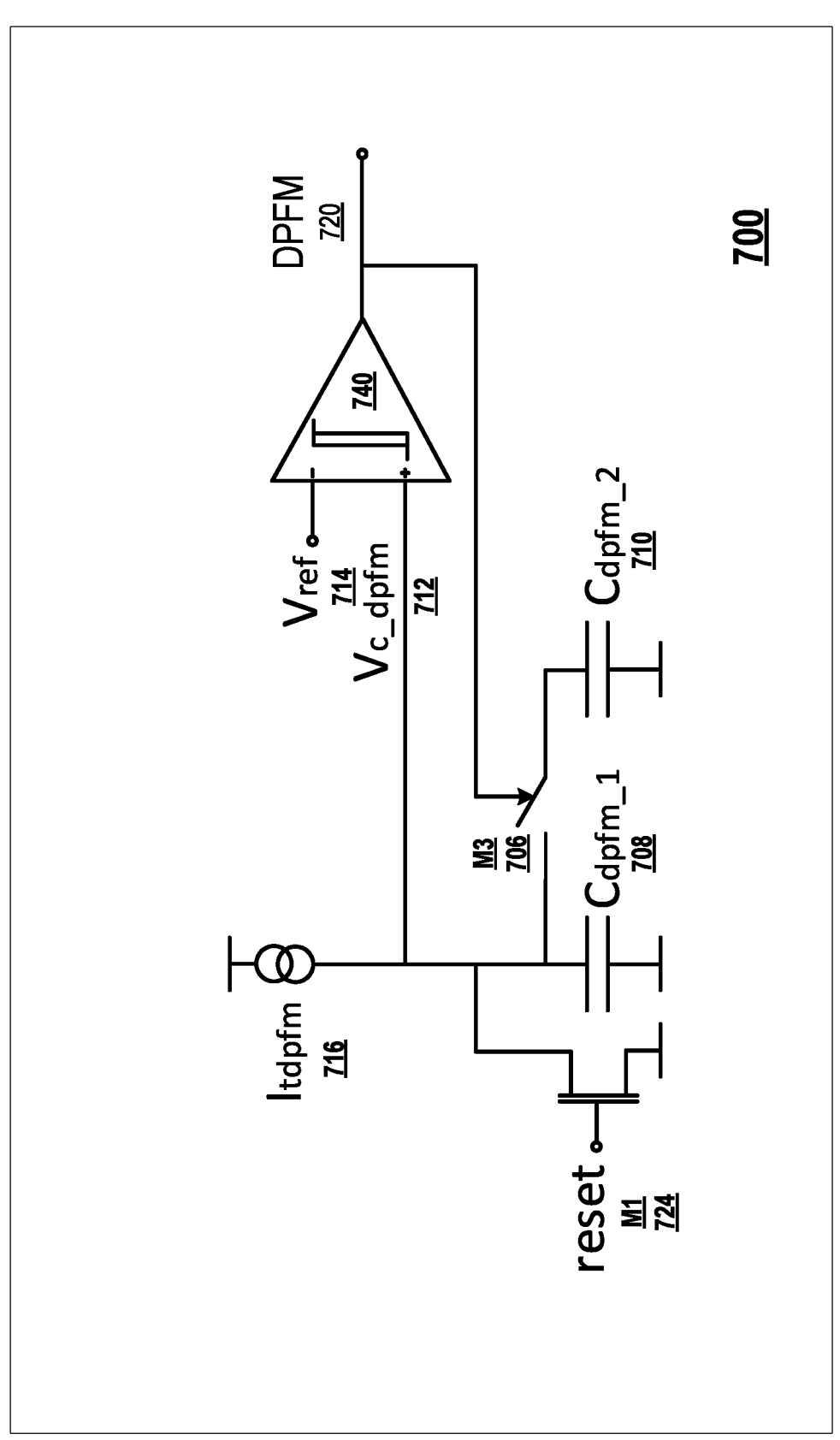
FIG. 7 is an example schematic diagram illustrating an example analog implementation of circuitry of this disclosure configured to adjust Ton-min, to adjust Tdpfm and shift the DPFM exit threshold boundary.

FIG. 7 is an example schematic diagram illustrating an example analog implementation of circuitry of this disclosure configured to adjust Ton-min, and to adjust Tdpfm and shift the DPFM exit threshold boundary. The operation of circuit 700 is described above in relation to FIG. 3, e.g., to generate a Tdpfm time reference to determine the threshold of DPFM operating mode.

Circuit 700 is an example of $T_{DPFM}$ circuitry 112 described above in relation to FIG. 1 and may connect to circuit 500 described above in relation to FIGS. 5A and 5B. Circuit 700, in the example of FIG. 7, includes comparator 740, current $I_{Tdpfm}$ 716, output DPFM 720, reset transistor M1 724 and also includes capacitors Cdpfm-1 708 and Cdpfm_2 710 connected in parallel, along with switch M3 706. Closing switch M3 706 increases the capacitance of Cdpfm, e.g., Cdpfm becomes the sum of Cdpfm-1 708 and Cdpfm-2 710, and therefore increasing the threshold duration Tdpfm. Circuit 700 is separate from circuit 500 and DPFM 542 signal of FIG. 5B corresponds to the output of comparator 740, DPFM 720.

Circuit 700 is arranged with DPFM 720 as the output of comparator 740. Reference voltage Vref 714 connects to the inverting input and the charge voltage of the capacitor circuit, Vc_dpfm 712 connects to the non-inverting input of comparator 740. Vref 714 may be set to a different value than Vref 554 described above in relation to FIG. 5B. The output of comparator 740 controls the operation of switch M3 706, which connects Cdpfm_1 708 and Cdpfm_2 710 at the node for Vc_dpfm 712. Reset switch M1 724 is configured to short the node for Vc_dpfm 712 to ground when closed. The current $I_{Tdpfm}$ 716 is injected in to the one or both of the capacitors Cdpfm_1 708 and Cdpfm_2 710.

Similar to FIG. 5B, to increase the minimum on-time, circuit 700 is configured to increase a circuit capacitance by closing switch M3 706, up-shift, e.g., increase, Vref 714 and/or decrease current $I_{Tdpfm}$ 716 injected into the circuit capacitance comprising one or both of capacitors Cdpfm_1 708 and Cdpfm_2 710. Similarly, the modulation circuitry comprising circuit 700 is configured to increase the threshold period duration by increasing the circuit capacitance of circuit 700, increase Vref 714 and/or decrease the current injected into the circuit capacitance.

FIG. 8 is timing chart illustrating an example of extending time periods when in DPFM. When load demand decreases at 820, the voltage on the circuit capacitance, Vc_dpfm 808 eventually has enough time to reach the reference voltage Vref 806, at 822, which exceeds the threshold Tdpfm_1 814. When operating in DPFM, comparator 740 of FIG. 7 asserts the DPFM 720 signal, DPFM 812 at time 822, which causes Ton_min 804 to increase during the next cycle, as well as the threshold to increase to Tdpfm_2 816. As the load demand 802 increases again at 824, the regulation loop reduces the switching period to a value smaller than Tdpfm_2, exiting DPFM operating region (as visible in the third-last Ton_min pulse). The threshold moves back to Tdpfm_1 814 after the reset 810.

FIG. 9 is a flow chart illustrating an example operation of the circuitry of this disclosure. The blocks of FIG. 9 will be described in terms of FIGS. 1, 5A, 5B and 6, unless otherwise noted.

A power converter system, e.g., system 100 of FIG. 1, may receive, at an input terminal to a DC-DC power converter circuit, e.g., power converter 120, an input voltage Vin 104 (90). In some examples the input voltage may vary, and power converter 120 may be configured to output a current, Iout 136 to load 140, as the load demand changes, at a consistent output voltage Vout 132, even as Vin 104 varies.

Modulation circuitry of power converter 120, e.g., Ton_min circuitry 110, connected to the input terminal, may also receive Vin 104 (92). Ton_min circuitry 110 may generate an adjustment to the minimum on-time based on the input voltage, as shown in FIG. 5A (94). As described above in relation to FIGS. 1-8, Ton_min circuitry 110 may modulate Ton_min, where the adjustment is proportional to an inverse magnitude of the input voltage, e.g., 1/(Vin 104) and depends on whether operating region is DPFM. As described above, the minimum on-time is a minimum duration for an on-time of a duty cycle for an operating frequency of the circuit, as the circuit moves between operating modes, e.g., PWM-CCM, PWM-DCM and PFM and other modes as described above in relation to FIGS. 2A, 2B and 3.

As described above in relation to FIGS. 2A, 2B and 3, in response to the magnitude of Vin 104 being less than or equal to a first threshold voltage 252, Ton_min circuitry 110 may set the minimum on-time to a fixed value 256 (96). Similarly, in response to the magnitude of Vin 104 exceeding a second threshold voltage, the modulation circuitry may set the minimum on-time to a second fixed value 258 (98).

In other examples, Ton-min circuitry may be configured with a minimum Ton_min value 258 and a maximum Ton_min value 256 and the modulation circuitry may modulate Ton_min according to 1/Vin, but without regard for a threshold input voltage. In other words, Ton-min circuitry 110 may maintain Ton_min according to 1/Vin as long as Ton_min is in the range between a threshold a minimum Ton_min value 258 and a threshold maximum Ton_min value 256. As noted above, maintaining the Ton_min value within a specified range may be described as "clipping" Ton_min.

The techniques of this disclosure may also be described in the following example clauses.

Clause 1: A circuit comprising an input terminal configured to receive an input voltage; and modulation circuitry connected to the input terminal, wherein the modulation circuitry is configured to define a minimum on-time based on the input voltage, wherein minimum on-time is proportional to an inverse magnitude of the input voltage, and wherein the minimum on-time is a minimum duration for an on-time of a duty cycle for an operating frequency of the circuit.

Clause 2: The circuit of clause 1, wherein the modulation circuitry is further configured to: in response to the magnitude of the input voltage being less than or equal to a first threshold voltage, set the minimum on-time to a first fixed value; and in response to the magnitude of the input voltage exceeding a second threshold voltage, set the minimum on-time to a second fixed value.

Clause 3: The circuit of any of clauses 1 and 2, wherein the circuit comprises a power converter circuit configured to receive the input voltage and generate an output voltage, and wherein the circuit is configured to operate in at least one of: pulse-width modulation (PWM) continuous conduction mode (CCM), PWM discontinuous conduction mode (DCM), pulse frequency modulation (PFM) CCM, or PFM-DCM.

Clause 4: The circuit of clause 3, wherein the operating frequency has an associated operating period, while operating in PFM and in response to the associated operating period exceeding a threshold period duration, increase the minimum on-time.

Clause 5: The circuit of clause 4, wherein to increase the minimum on-time, the circuit is configured to: increase a circuit capacitance, up-shift a reference voltage, or decrease a current injected into the circuit capacitance.

Clause 6: The circuit of any of clauses 4 and 5, wherein in response to the associated operating period exceeding the threshold period duration the circuit is configured to operate in deep-PFM (DPFM), and increase the threshold period duration, such that: the circuit enters DPFM with a first set of operating conditions of the input voltage and an output current, and the circuit exits DPFM with a second set of operating conditions.

Clause 7: The circuit of any of clauses 4 through 6, wherein the modulation circuitry comprises DPFM circuitry configured to increase the threshold period duration by: increasing the circuit capacitance of the modulation circuitry, up-shift a reference voltage or decrease the current injected into the circuit capacitance.

Clause 8: A system comprising an output terminal configured to deliver power to a load; an input terminal configured to receive an input voltage; and modulation circuitry connected to the input and output terminals and configured to: define a minimum on-time based on the input voltage, wherein the adjustment is proportional to an inverse magnitude of the input voltage, and wherein the minimum on-time is a minimum duration for an on-time of a duty cycle for an operating frequency of the circuit.

Clause 9: The system of clause 8, wherein the modulation circuitry is further configured to: in response to the magnitude of the input voltage being less than or equal to a first threshold voltage, set the minimum on-time to a first fixed value; and in response to the magnitude of the input voltage exceeding a second threshold voltage, set the minimum on-time to a second fixed value.

Clause 10: The system of any of clauses 8 and 9, wherein the circuit comprises a power converter circuit configured to receive the input voltage and generate the output voltage, and wherein the circuit is configured to operate in at least one of: pulse-width modulation (PWM) continuous conduction mode (CCM), PWM discontinuous conduction mode (DCM) or pulse frequency modulation (PFM) CCM, or PFM-DCM.

Clause 11: The system of clause 10, wherein the operating frequency has an associated operating period, while operating in PFM and in response to the associated operating period exceeding a threshold period duration, increase the minimum on-time.

Clause 12: The system of clause 11, to increase the minimum on-time, the circuit is configured to: increase a circuit capacitance, up-shift a reference voltage or decrease a current injected into the circuit capacitance.

Clause 13: The system of any of clauses 11 and 12, wherein, in response to the associated operating period exceeding the threshold period duration the circuit is configured to operate in deep-PFM (DPFM), and increase the threshold period duration.

Clause 14: The system of any of clauses 11 through 13, wherein the DPFM circuitry is configured to increase the threshold period duration by increasing a capacitance of the DPFM circuitry, increase a reference voltage or decrease a current injected into the capacitance of the DPFM circuitry.

Clause 15: The system of any of clauses 8 through 14, wherein the input terminal is configured to receive the input voltage from a battery.

Clause 16: A method comprising receiving, at an input terminal, an input voltage; and receiving, by modulation circuitry connected to the input terminal, the input voltage; generating, by the modulation circuitry, an adjustment to a minimum on-time based on the input voltage, wherein the adjustment is proportional to an inverse magnitude of the input voltage, and wherein the minimum on-time is a minimum duration for an on-time of a duty cycle for an operating frequency of the circuit.

Clause 17: The method of clause 16, further comprising in response to the magnitude of the input voltage being less than or equal to a first threshold voltage, setting, by the modulation circuitry, the minimum on-time to a first fixed value; and in response to the magnitude of the input voltage exceeding a second threshold voltage, setting, by the modulation circuitry, the minimum on-time to a second fixed value.

Clause 18: The method of any of clauses 16 and 17, wherein the circuit comprises a power converter circuit configured to receive the input voltage and generate an output voltage, the method further comprising operating in at least one of pulse-width modulation (PWM) continuous conduction mode (CCM), PWM discontinuous conduction mode (DCM), pulse frequency modulation (PFM) CCM, or PFM-DCM.

Clause 19: The method of any of clauses 16 through 18, wherein the operating frequency has an associated operating period, the method further comprising, in response to the associated operating period exceeding a threshold period duration, operating in deep-PFM (DPFM), and increasing the minimum on-time.

Clause 20: The method of clause 19, the method further comprising, in response to the associated operating period exceeding the threshold period duration, increasing the threshold period duration.

In one or more examples, the functions described above may be implemented in hardware, software, firmware, or any combination thereof. For example, the various components of FIG. 1 may be implemented in hardware, software, firmware, or any combination thereof. If implemented in software, the functions may be stored on a tangible computer-readable storage medium and executed by a processor or hardware-based processing unit.

Instructions may be executed by one or more processors, such as one or more digital signal processors (DSPs), general purpose microprocessors, application specific integrated circuit (ASIC), Field programmable gate array (FPGAs), or other equivalent integrated or discrete logic circuitry. Accordingly, the term "processor," and "processing circuitry" as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described.

Various examples of the disclosure have been described. These and other examples are within the scope of the following claims.

What is claimed is:

1. A power converter circuit configured to operate in a pulse-width modulation (PWM) continuous conduction mode (CCM), a PWM discontinuous conduction mode (DCM), and a deep-pulse frequency modulation (DPFM) mode, the power converter circuit comprising:
an input terminal configured to receive an input voltage; and
modulation circuitry connected to the input terminal, wherein the modulation circuitry is configured to define a minimum on-time based on the input voltage, wherein the minimum on-time is proportional to an inverse magnitude of the input voltage, and wherein the minimum on-time is a minimum duration for an on-time of a duty cycle for an operating frequency of the power converter circuit,
wherein the power converter circuit is configured to:
in response to a magnitude of the input voltage being less than or equal to a first threshold voltage, set the minimum on-time to a first fixed value; and
in response to the magnitude of the input voltage exceeding a second threshold voltage, set the minimum on-time to a second fixed value, wherein the operating frequency of the power converter circuit has an associated operating period, and while operating in DPFM mode and in response to the associated operating period exceeding a threshold period duration, the power converter circuit is configured to increase the minimum on-time,
wherein the power converter circuit is further configured to:
update a value of a DPFM timer for the threshold period duration while operating in DPFM mode such that:

the power converter circuit enters the DPFM mode with a first set of operating conditions of the input voltage and an output current, and the power converter circuit exits DPFM mode with a second set of operating conditions.

2. The circuit of claim 1, wherein the operating frequency has the associated operating period, while operating in the DPFM mode and in response to the associated operating period exceeding the threshold period duration, increase the minimum on-time.

3. The circuit of claim 2, wherein to increase the minimum on-time, the power converter circuit is configured to: increase a circuit capacitance, up-shift a reference voltage, or decrease a current injected into the circuit capacitance.

4. The circuit of claim 1, wherein the modulation circuitry is configured to increase the threshold period duration by: increasing a circuit capacitance of the modulation circuitry, up-shift a reference voltage, or decrease a current injected into the circuit capacitance.

5. A power converter system configured to operate in a pulse-width modulation (PWM) continuous conduction mode (CCM), a PWM discontinuous conduction mode (DCM), and a deep-pulse frequency modulation (DPFM) mode, the power converter system comprising:

an output terminal configured to deliver power to a load;

an input terminal configured to receive an input voltage; and modulation circuitry connected to the input and output terminals and configured to:

define a minimum on-time based on the input voltage, wherein an adjustment to the minimum on-time is proportional to an inverse magnitude of the input voltage, and wherein the minimum on-time is a minimum duration for an on-time of a duty cycle for an operating frequency of the power converter system wherein the power converter system is configured to:

in response to a magnitude of the input voltage being less than or equal to a first threshold voltage, set the minimum on-time to a first fixed value; and in response to the magnitude of the input voltage exceeding a second threshold voltage, set the minimum on-time to a second fixed value, wherein the operating frequency of the power converter system has an associated operating period, and while operating in DPFM mode and in response to the associated operating period exceeding a threshold period duration, the power converter system is configured to increase the minimum on-time, wherein the power converter system is further configured to:

update a value of a DPFM timer for the threshold period duration while operating in DPFM mode such that:

the power converter system enters the DPFM mode with a first set of operating conditions of the input voltage and an output current, and the power converter system exits DPFM mode with a second set of operating conditions.

6. The system of claim 5, wherein the operating frequency has the associated operating period, while operating in the DPFM mode and in response to the associated operating period exceeding the threshold period duration, increase the minimum on-time.

7. The system of claim 6, to increase the minimum on-time, the power converter system is configured to:

increase a circuit capacitance, up-shift a reference voltage, or decrease a current injected into the circuit capacitance.

8. The system of claim 6, wherein, in response to the associated operating period exceeding the threshold period duration the power converter system is configured to operate in the DPFM mode and increase the threshold period duration.

9. The system of claim 6, wherein the power converter system includes DPFM circuitry and the DPFM circuitry is configured to increase both the minimum on-time and the threshold period duration by increasing a capacitance of the DPFM circuitry.

10. The system of claim 5, wherein the input terminal is configured to receive the input voltage from a battery.

11. A method performed by a power converter that is configured to operate in a pulse-width modulation (PWM) continuous conduction mode (CCM), a PWM discontinuous conduction mode (DCM), and a deep-pulse frequency modulation (DPFM) mode, the method comprising:

receiving, at an input terminal of the power converter, an input voltage; and receiving, by modulation circuitry of the power converter connected to the input terminal, the input voltage; and generating, by the modulation circuitry, an adjustment to a minimum on-time based on the input voltage, wherein the adjustment is proportional to an inverse magnitude of the input voltage, and wherein the minimum on-time is a minimum duration for an on-time of a duty cycle for an operating frequency of the power converter, the method further comprising:

in response to a magnitude of the input voltage being less than or equal to a first threshold voltage, setting the minimum on-time to a first fixed value; and in response to the magnitude of the input voltage exceeding a second threshold voltage, setting the minimum on-time to a second fixed value, wherein the operating frequency of the power converter has an associated operating period, and while operating in DPFM mode and in response to the associated operating period exceeding a threshold period duration, the power converter is configured to increase the minimum on-time; and updating a value of a DPFM timer for the threshold period duration while operating in DPFM mode such that:

the power converter enters the DPFM mode with a first set of operating conditions of the input voltage and an output current, and the power converter exits DPFM mode with a second set of operating conditions.

12. The method of claim 11, wherein the operating frequency has an associated operating period, the method further comprising, in response to the associated operating period exceeding a threshold period duration, operating in the DPFM mode and increasing the minimum on-time.

13. The method of claim 12, the method further comprising, in response to the associated operating period exceeding the threshold period duration, increasing the threshold period duration.

* * * * *